Oct. 5, 1965 H. CLOW 3,210,742
MAGNETIC STORAGE DEVICES
Filed March 26, 1962
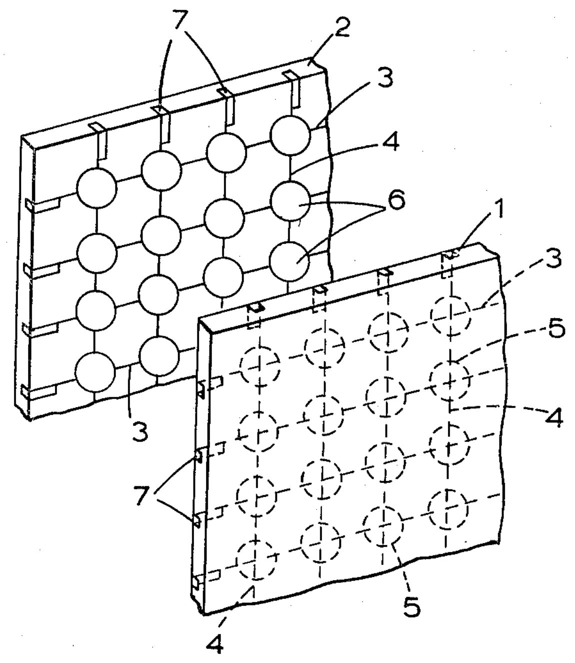

United States Patent Office 3,210,742
Patented Oct. 5, 1965

3,210,742
MAGNETIC STORAGE DEVICES

Hugh Clow, London, England, assignor to Electric & Musical Industries Limited, Hayes, England, a company of Great Britain Filed Mar. 26, 1962, Ser. No. 182,291
Claims priority, application Great Britain, Apr. 6, 1961, 12,295/61
8 Claims. (Cl. 340—174)

This invention relates to magnetic storage devices, such as may be used in computers for memory or switching purposes. The invention relates in particular to storage devices of the kind in which the storage cores comprise thin magnetic material deposited on a support and having electrical conductors associated therewith.

By depositing magnetic material on a support under suitable conditions and in the presence of a magnetic field, it is possible to provide thin magnetic elements having a preferred axis of magnetisation, and it is desirable for many purposes that this axis should be accurately defined. However, it is found in practise that the axis tends to be indeterminate and somewhat diffuse, which is disadvantageous. For example, in a common mode of operation, each magnetic element is employed to store the value of a binary digit, one digit value being denoted by orientating the magnetisation in one sense along the preferred axis, and the other digit value being denoted by orientating the magnetisation in the opposite sense along the preferred axis. To interrogate the stored digit value, and to store another, the magnetisation of the respective element is first rotated to a direction at right angles thereto by an applied field of a particular sense normal to the preferred axis. This reduces the flux linked with a sensing conductor to zero or approximately so, giving rise to a signal of one polarity or another, according to the original sense of the magnetisation. Thereafter a small field, acting along the preferred axis in a sense which is determined by the value of the digit now to be stored, is added to reset the magnetisation of the element in the desired sense along the preferred axis. If the preferred axis is diffuse it is, however, found that a greater field is required to reset the magnetisation along the preferred axis, reducing the operative range of the digit current which is used to generate this resetting field, since the permitted upper limit of this field is about equal to the coercivity of the elements. The indeterminacy of the preferred axis can be reduced by reducing the thickness of the magnetic elements but it is found that when the element is made thin enough to achieve a significant improvement in the determination of the preferred axis, the output signals which can be obtained are undesirably low.

The object of the invention is to provide an improved magnetic storage device with a view to reducing the disadvantage indicated in the preceding paragraph.

According to the present invention there is provided a magnetic storage device comprising two supports each provided with a deposit of magnetic material having a preferred direction of magnetisation, and at least one electrical conductor capable of inducing or sensing magnetisation changes in the magnetic material, the supports being arranged so that the two deposits are face to face with the preferred directions of magnetisation running in substantially the same direction and so close as to be magnetically coupled, and all conductors which are provided for inducing or sensing magnetisation changes in said magnetic material being disposed wholly on the non-facing sides of said deposits.

In a preferred embodiment of the invention, two sets of mutually insulated and mutually perpendicular conductors are provided adhering to one surface of each of two substrates, the two substrates with said adhering conductors forming the two supports for the deposits. The deposits are provided on top of the insulated conductors, the deposit on each support being in the form of discrete magnetic elements overlying each intersection of the respective two sets of conductors, and the supports are arranged so that corresponding discrete elements on the two supports are face to face, the discrete elements either being in contact or being spaced at a small distance from each other. It will be understood that each pair of face to face magnetic elements constitutes a magnetic storage core.

In order that the present invention may be clearly understood and readily carried into effect, it will now be more fully described with reference to the single figure of the accompanying drawing which shows part of a magnetic storage device according to one example of the invention, the device being suitable for use as a computer memory device. The two supports which are included in the device illustrated in the drawing are shown separated for convenience of illustration.

The device shown in the drawing comprises two insulating substrates 1 and 2 which may be made of glass, ceramic or a plastic material on each of which are two sets of adhering conductors 3 and 4 respectively at right angles as shown. The conductors 3 and 4 respectively are covered with thin insulating films so that they are insulated from each other and from the magnetic elements which are deposited on top of them. The conductors can be formed by any of the methods which are now regarded as included within the description "printing." Such methods include direct printing with a conducting material, the method in which a conducting layer is provided over the entire support and areas intermediate the required conductors are etched away, and the method in which a thin conducting coating is applied, such as by spraying, over the whole area of the support, areas intermediate required conductors are coated with a plating resist and the conductors are built up by electroplating a conducting material on the exposed areas of the coating, the resist and areas of said coating thereunder being subsequently removed. The description "printing" is also intended to include the formation of conductors by evaporating conducting material through a mask and then, preferably, building up the conductors by electroplating so as to increase the conductivity.

On the conductors 3 and 4 are provided magnetic elements 5 and 6, the elements 5 being disposed in an array of rows and columns on support 1 and the elements 6 being likewise disposed in an array of rows and columns on support 2 so that said elements 5 and 6 correspond in position. The elements 5 overlie each intersection of the conductors 3 and 4 on the substrate 1, and the elements 6 overlie each intersection of the conductors 3 and 4 on substrate 2. The conductors 3 are associated with the elements on the substrate 2 in rows, say, whilst the conductors 4 are associated with the elements in columns. The elements 5 and 6 are thin films of magnetic material the thickness being such that two elements overlying each other are of suitable thickness for use as a magnetic core member. Each thin film may be, for example, approximately 500° A. thick. The elements 5 and 6 are preferably made of a nickel iron alloy comprising approximately 80 percent nickel and 20 percent iron and said elements 5 and 6 may, for example, be deposited on top of the conductors on the substrates 1 and 2 by evaporation through a mask so that when said mask is subsequently removed discrete magnetic elements remain on the supports formed by the substrates and the adhering conductors and insulating films. In the embodiment shown in the drawing the elements 5 and 6 are circular in shape but they may be of any suitable shape, for example, rectangular. The elements 5 and 6 are deposited by evaporaiton in the presence of a magnetic field which is orientated so that the preferred axis of magnetisation of the elements 5 and 6 is parallel to the conductors 3.

The conductors 3 and 4 are shown in the drawing as being of narrow width for ease of illustration but they may be of any suitable width up to or even exceeding the width of the elements 5 and 6, or said conductors 3 and 4 may be broad where they cross the elements 5 and 6 but narrow between said elements. The conductors preferably terminate in wider or reinforced portions 7 which conveniently extend to edges of the supports 1 and 2 so as to constitute terminals to which current supply conductors or connecting pieces can be connected.

In order to complete the store the two substrates 1 and 2 are assembled together with the elements 5 and 6 facing and overlying each other. The substrates 1 and 2 can be assembled with said elements 5 and 6 in contact with each other or slightly spaced apart but so as to be magnetically coupled, or alternatively, if desired, said supports 1 and 2 can be separated by an insulating layer which may be either a self supporting sheet or in the form of a layer of insulating material deposited on one or both of the supports 1 and 2 to cover the conductors and elements 5 on the substrate and/or the conductors and elements 6 on the other substrate. Even when separated by insulating material the elements 5 and 6 are magnetically coupled.

Moreover each of the conductors 3 on one substrate is connected at one end to the corresponding end of the corresponding conductor 3 on the other substrate so as to form a set of address circuits in the form of loops embracing the respective rows of magnetic storage cores, each storage core comprising one element 5 and one element 6. An address signal is applied to a particular circuit by applying a voltage between the unjoined ends of the respective pair of conductors 3. Similarly each of the conductors 4 on one substrate is connected at one end to the corresponding end of the corresponding conductor on the other substrate so as to form a set of digit circuits. Thus, in operation of the magnetic storage device described, the conductors 3 and 4 are employed as so-called address and digit conductors. The store may also, as is usual, comprise separate sense conductors (not shown) insulated from the address and digit conductors and linking the magnetic cores together in columns to sense magnetisation changes in the cores.

Modifications may of course be made in the construction of the storage device which is illustrated. For example the magnetic material which is deposited on the supports may be continuous films.

What I claim is:

1. A magnetic storage device comprising two supports each provided with a deposit of magnetic material having a preferred direction of magnetisation, and at least one electrical conductor capable of inducing or sensing magnetisation changes in the magnetic material, the supports being arranged so that the two deposits are face to face with the preferred directions of magnetisation running in substantially the same direction and so close as to be magnetically coupled, and all conductors which are provided for inducing or sensing magnetisation changes in said magnetic material being disposed wholly on the non-facing sides of said deposits.

2. A magnetic storage device according to claim 1 wherein one at least of said supports comprises a substrate having a conductor adhering to one surface thereof for inducing or sensing magnetisation changes in the magnetic material, the respective deposit being provided on top of said conductor.

3. A magnetic storage device according to claim 1, wherein the deposit on each support is in the form of discrete magnetic elements, the supports being arranged so that corresponding discrete elements on the two supports are face to face so that each pair of elements forms a magnetic storage core.

4. A magnetic storage device according to claim 3 wherein each support comprises a substrate having two sets of mutually insulated and mutually perpendicular conductors adhering to one surface thereof, the deposit on each support being in the form of discrete magnetic elements overlying each intersection of the respective two sets of conductors, and the supports being arranged so that the corresponding discrete elements on the two supports are face to face.

5. A magnetic storage device according to claim 4 wherein each of the conductors of each set on one substrate is connected at one end to the corresponding end of the corresponding conductor on the other substrate, whereby the conductors form two sets of circuits embracing the respective magnetic storage cores.

6. A magnetic storage device according to claim 4 wherein said discrete magnetic elements are deposited on top of the respective sets of conductors, so that the conductors are disposed between the elements and the respective substrates.

7. A magnetic storage device according to claim 1 wherein the deposits of magnetic material on the two supports are in contact.

8. A magnetic storage device according to claim 1 wherein said deposits are in the form of continuous films.

References Cited by the Examiner

UNITED STATES PATENTS

| | | | |
|---|---|---|---|
| 3,048,829 | 8/62 | Bradley | 340—174 |
| 3,054,094 | 9/62 | Stuckert | 340—174 |
| 3,070,783 | 12/62 | Pohm | 340—174 |

FOREIGN PATENTS

| | | |
|---|---|---|
| 854,153 | 11/60 | Great Britain. |

IRVING L. SRAGOW, *Primary Examiner.*